Patented Mar. 26, 1935

1,995,545

UNITED STATES PATENT OFFICE 1,995,545

PROCESS OF REMOVING SULPHUR COMPOUNDS FROM GAS

Michael J. Leahy, Fort Worth, Tex.

No Drawing. Application July 12, 1933, Serial No. 680,149

9 Claims. (Cl. 23—225)

The invention relates to the removal of sulphur compounds, more particularly hydrogen sulphide, from fuel gases such as natural gas or the like.

Natural gas and refinery still gases are frequently sufficiently charged with hydrogen sulphide to make them undesirable or unusable as fuels especially for domestic uses.

It is an object of the invention to provide a process for removal of hydrogen sulphide from fuel gases which will be commercially usable.

It is a further object of the invention to provide a process of the character stated that will purify fuel gases by the removal of hydrogen sulphide and/or other sulphur compounds therefrom so as to make the same acceptable as fuels.

It is a further object of the invention to provide a process of the nature stated that will be continuous and cyclic in operation and wherein the treating substances may be used indefinitely and therefore cheaply.

It is a further object of the invention to provide a process of the character stated which will result in the recovery of sulphur and/or other solid sulphur containing compounds in such form as to make it, or them unusually valuable.

It is a further object of the invention to provide a process of the character stated which may be used, not only for the removal of sulphur compounds from fuel gases, but also for the preparation and mixing of compounds containing sulphur in a finely divided state, and/or mixtures containing sulphur compounds, such as fertilizers, insecticides, fungicides, etc., directly in the process by using the proper chemicals in the treating solutions.

Further objects of the invention will appear from the following description of illustrative embodiments of the invention.

About the year 1846 Wackenroder made a solution of sulphurous acid into which he then passed hydrogen sulphide. The solution became yellow and turbid with finely divided sulphur which would not settle out of solution.

Since that time many chemists have prepared this solution, which has become known as Wackenroder's Solution, and have analyzed it repeatedly. In addition to sulphur, sulphurous acid and hydrosulphuric acid, nearly all of the polythionic acids are known to exist in this solution. Further, if the materials—water, $SO_2$ and $H_2S$—used are not pure, much trithionate and tetrathionate are formed in the solution.

In spite of the fact that it was well known that sulphur could not be successfully precipitated from Wackenroder's Solution, many inventors have attempted to reduce this procedure to commercial use and many patents have been granted on variations of Wackenroder's method, both here and in foreign countries. None of these processes have proven to be of value in commercial practice.

Believing that the method was fundamentally incorrect, I reversed the procedure and first absorbed $H_2S$ in water and then passed $SO_2$ gas into this solution. I obtained a canary yellow liquid when distilled water was used. However, as soon as a few drops of a solution of an electrolyte were added, the sulphur would begin to settle from the solution and the liquid would soon become clear. The precipitated sulphur would be extremely fine and would have a greasy appearance.

As my experiments continued I found that some of the electrolytes, especially the double and complex electrolytes, would precipitate the sulphur from solution more rapidly than would others. Further, I discovered that after all of the sulphur had once been precipitated from the liquid, it was then capable of absorbing far greater volumes of $H_2S$ than would pure water. Then as soon as $SO_2$ was passed into this solution, sulphur would immediately precipitate and settle out rapidly.

I continued my experiments and made an effort to discover the reason why some of the electrolytes in solution would absorb $H_2S$ more rapidly and completely and why others would coagulate or coalesce the precipitated sulphur more readily. This led to the discovery that the alkaline earth electrolytes as a class were the best coagulants, but were rather poor $H_2S$ absorbents.

The electrolytes containing elements of high valences on the other hand, would more readily absorb $H_2S$, but would not coagulate and precipitate the sulphur efficiently. If, however, I used a solution containing an electrolyte which would coagulate sulphur readily and another electrolyte which would increase the absorption of $H_2S$, I was able in nearly all cases to obtain excellent results. I then found that if the two electrolytes contained unlike ions, the results obtained were even better than before.

Further, I found that the solution would remain active indefinitely so that after once being made up properly no further quantities of chemicals needed to be added if pure precipitated sulphur was being produced.

Continuing my experiments, I discovered that many soluble double and complex electrolytes complied with all of the above requirements and therefore exceptional results could be obtained with the use of a solution containing but one of these double or complex electrolytes.

To carry out the process of the invention the fuel gas containing hydrogen sulphide or other sulphur compounds is first contacted with a treating liquid which is capable of absorbing such compounds from the gas, preferably utilizing solutions of the materials hereinafter described or others having the described characteristics and chosen by the described principles.

After contacting the gases under treatment with the treating liquid, the gases are separated therefrom and passed to gas mains, storage, or are used immediately for fuel purposes.

The treating liquid, after the fuel gases have been separated therefrom, is subjected to treatment to precipitate the sulphur and/or sulphur containing compounds and such sulphur and/or other solids are then removed from the treating liquid by settlement or filtration, or both, so as not to waste quantities of the treating liquid. Such sulphur and/or other solids are then dried whereupon they disintegrate to fine powder.

The step of precipitating sulphur and/or sulphur containing compounds from the treating liquid containing hydrogen sulphide in absorption comprises contacting such treating liquid with the oxides of sulphur ordinarily produced in a sulphur burner. The invention therefore is not limited to the use of sulphur dioxide alone as all of the possible oxides of sulphur are produced in a sulphur burner.

After the sulphur and/or sulphur containing compounds are removed from the treating liquid, such liquid is again contacted with the untreated fuel gases. Therefore the process is continuous and cyclic in character.

The process embodied in the present invention has been experimented with by me for several years and I have endeavored to find a satisfactory cause for the fact that under certain conditions complete treatment of the fuel gases could be obtained while under conditions that were supposed to be identical only partial treatment could be obtained. Experiments conducted under actual plant operating conditions have demonstrated that the following conditions relating to the preparation and use of the treating liquid must be met before complete treatment of the fuel gases and maximum precipitation of the sulphur and/or sulphur containing compounds may be obtained.

First, the treating liquid is prepared for use by dissolving two or more soluble electrolytes, the positive or negative ions, or both, of which are unlike, in a satisfactory solvent, usually water. The electrolytes used should have not only unlike ions, but these ions should not react with each other in solution in such a way as to precipitate one, or both, from solution.

Second, the treating liquid, after being prepared as outlined, should be contacted with the untreated fuel gases first before it is contacted with the sulphur oxides in order to prevent the formation of sulphuric and/or thionic acids in the treating liquid as these acids tend to reduce the efficiency of the treating liquid due, no doubt, to their reaction with the hydrocarbons present in the fuel gases with the formation of tarry matters in the treating liquid.

When it is desired to produce pure and very finely divided sulphur in my gas treating process, two soluble electrolytes are chosen, one of which has the capacity to coagulate or coalesce the sulphur as quickly as formed and the other the capacity to absorb $H_2S$ readily and produce very finely divided sulphur.

For example: Sodium chloride dissolved in water will coagulate precipitated sulphur readily, thereby causing the sulphur to settle in solution rapidly; while magnesium sulphate in water solution will produce a very fine sulphur which, when dry, has a particle diameter of less than one micron. Therefore, a very small amount of sodium chloride is dissolved in relatively pure water and then about twice the above amount of magnesium sulphate is added to, and dissolved in, this solution. The solution so prepared is contacted first with the gas containing $H_2S$ and then with sulphur oxide gases which precipitates pure and colloidal—but coagulated—sulphur. The sulphur so obtained is bright yellow in color and is exceptionally fine in texture.

While the chemicals used in the above cited example comply with all of the requirements of an ideal treating solution in that both are soluble electrolytes containing unlike ions (Cl and $SO_4$), and both elements of which have valences greater than unity, I do not limit my invention to the use of these specific chemicals for the removal of hydrogen sulphide from gas and the production of sulphur, but merely cite these as an illustrative example.

*Producing fertilizer*

When it is desired to produce a fertilizer compound directly in my gas treating process at the same time that $H_2S$ is being removed from the gas, two soluble electrolytes are chosen at least one of which in itself has value as a fertilizer. A strong solution is made of these electrolytes in relatively pure water so that the fertilizer component, or components, are present in a nearly saturated condition.

Sulphur itself—especially when finely divided and chemically active as is mine—is an exceptionally good fertilizer particularly on alkaline soils. Therefore the addition of electrolytes having in themselves value as fertilizers increases the value of the compound obtained in the process as a fertilizer.

Since the sulphur or fertilizer compounds formed in my gas treating process are removed from the system while they still contain from forty percent to eighty percent of moisture, and this moisture is in reality a saturated solution of electrolytic fertilizer compounds, on drying the resulting dry compound contains, not only precipitated sulphur, but also certain proportions of the said fertilizer compounds. The proportion in which each of these is present may be varied at will simply by increasing or decreasing the amounts of fertilizer compounds present in the treating solution.

An illustrative example of the production of fertilizer compounds in my treating process follows: a strong solution is made by dissolving phosphoric acid (an excellent fertilizer) in relatively pure water. To this is added a strong solution of ammonium sulphate (another good fertilizer). This prepared treating solution is contacted first with gas containing $H_2S$ which is absorbed in the treating solution. The $H_2S$ charged solution is then contacted with sulphur oxide gases which precipitates sulphur and prepares the treating solution for re-use. The sulphur, together with varying amounts of the saturated solution, is removed from the system and is permitted to dry. The fertilizer compounds remain in the dry sulphur as only the water of the solution is evaporated.

Naturally, in the production of fertilizer compounds in my gas treating process, additional amounts of strong solutions containing soluble fertilizer electrolytes must be added to the treating solution in order to compensate for the amounts removed with the precipitated sulphur.

An example of the use of one only of a double electrolyte in the treating solution for the production of fertilizer compound is a strong solution of phosphotungstic acid. An example of the use of a complex electrolyte alone in the treating solution for the production of fertilizer compounds is magnesium ammonium chromate—$MgCrO_4 \cdot (NH_4)_2 CrO_4 \cdot 6H_2O$—.

Producing fungicide

The method of producing fungicides in my gas treating system is the same as above described for fertilizer production; except that, since the sulphur produced in my process is in itself an excellent fungicide, it is generally only necessary to use a treating solution composed of a strong solution of but one electrolyte that is in itself a good fungicide and a weak solution of an electrolyte capable of coagulating the sulphur readily.

Examples of good fungicidal electrolytes are: Copper sulphate, nicotine sulphate, or sodium thiosulphate, but I do not limit my invention to the use of the specified electrolytes.

Producing insecticides

The method of producing insecticides in my gas treating process is identical with that fully described for fertilizer production except that, precipitated sulphur being in itself a good insecticide, it is generally only necessary to use a treating solution containing but one soluble electrolyte that in itself is a good insecticide together with sufficient quantities of other soluble electrolytes capable of coagulating or coalescing the precipitated insecticidal compounds formed.

Examples of insecticidal electrolytes that may be used are: Soluble arsenic compounds, soluble lead compounds, Paris green dissolved in ammoniacal liquors, copper sulphate, etc.

It is well to remember that care must be exercised when two or more soluble electrolytes are used in any of my treating solutions to choose such that are compatible to each other when in solution so that one will not react with the other to form an insoluble precipitate or that they will not mutually precipitate each other from the solution. Further, when making use of a fresh solution for the first time, care should be taken to prevent the solution from remaining in contact with $H_2S$ for too long a period without reacting with sulphur oxide gases. Else there is danger in some cases of forming insoluble sulphides which would tend to reduce its activity. However, once my gas treating plant has been placed in continuous operation using any of the permitted solutions, there is no danger of such precipitation of sulphides nor is there any possibility of forming thionic acids, sulphurous acid, nor inert polythionates in the solution.

Soluble complex or double salts that are electrolytes have been used, either separately or in groups, in this invention with good results. Since these salts meet all the conditions imposed above in that they are soluble electrolytes, do not mutually precipitate each other from solution, and contain within themselves unlike ions; the scope of this invention is extended to cover the use of one or more such complex salts. Illustrative examples of such salts follow: Magnesium-potassium chlorides, sulphates, etc., aluminum-potassium tartrate, aluminum-sodium chloride, ammonium-ferric oxalate, cobaltous-ammonium chlorides and sulphates, and many others.

The substances already named as useful in the invention are illustrative only and are those at present preferred for the uses described. Many other substances have been tested and with observance of the principles enunciated have given useful results. Among such substances are the following:

| Acids | Acetates | Carbonates | Chlorides |
|---|---|---|---|
| Boric<br>Hydrochloric<br>Hydriodic<br>Sulphuric<br>Acetic | Calcium<br>Ferric<br>Magnesium<br>Mercury | Ammonium<br>Calcium<br>Magnesium<br>Potassium<br>Sodium | Ammonium<br>Aluminum<br>Calcium<br>Cupric<br>Ferrous<br>Magnesium<br>Potassium<br>Sodium |

| Di-chromates | Hydroxides | Sulphates |
|---|---|---|
| Ammonium<br>Potassium<br>Sodium | Calcium<br>Magnesium<br>Potassium<br>Sodium | Aluminum<br>Calcium<br>Cupric<br>Ferric<br>Ferrous<br>Magnesium<br>Potassium<br>Sodium |

| Sulphides | Sulphites | Thiosulphates |
|---|---|---|
| Ammonium<br>Magnesium<br>Potassium<br>Sodium | Ammonium<br>Calcium<br>Potassium<br>Sodium | Ammonium<br>Calcium<br>Barium<br>Lead<br>Magnesium<br>Potassium<br>Sodium<br>Zinc |

Successful results have been had with well water having the usual salts of hard water in solution.

The choice of an electrolyte is influenced by its cost as well as its results. Experiments with the salt water occurring at the oil fields show that substantially as good results may be obtained with this liquid as with any. This water contains not only common salt but numerous others of the electrolytes listed above.

Minor changes may be made in the steps of the invention or in the make-up of the solutions used within the scope of the appended claims without departing from the spirit of the invention.

I claim:

1. The process of removing hydrogen sulphide from fuel gas which comprises contacting the gas with a solution consisting of at least two electrolytes having unlike ions, said electrolytes so chosen as not to react with each other to cause a precipitate nor to react chemically with the hydrogen sulphide.

2. The cyclic process of removing hydrogen sulphide from fuel gas which comprises, contacting the gas with a solution of at least two electrolytes of such nature as not to combine to form a precipitate, separating the fuel gas from the solution for use, contacting the solution with gases resulting from burning sulphur and removing precipitated sulphur component from the solution to complete the cycle.

3. The cyclic process of removing hydrogen sulphide from fuel gas which comprises contacting the gas with a solution of at least two electrolytes comprising unlike ions, said electrolytes so chosen as not to form a precipitate by their combination in the solution, separating the fuel gas substantially free of sulphur compounds from the solution for use, contacting the sulphur charged solution with gas resulting from burning sulphur and separating precipitated sulphur component from the solution to complete the cycle.

4. The cyclic process of removing hydrogen sulphide from fuel gas which comprises contacting the gas with a solution of at least two electrolytes having unlike ions, one of said electrolytes having ions of a valence greater than two, said electrolytes so chosen as not to combine to produce a precipitate, separating the gas substantially free from sulphur compounds from the solution for use, contacting the sulphur charged solution with gas resulting from burning sulphur and separating precipitated sulphur component from the solution to complete a cycle.

5. The cyclic process of removing hydrogen sulphide from fuel gas which comprises contacting the gas with a solution of one or more double electrolytes so chosen as not to cause mutual precipitation while being dissolved, separating the gas substantially free of gaseous sulphur compounds from the solution, contacting the charged solution with gases resulting from burning sulphur, and separating the precipitated sulphur component from the solution to complete a cycle.

6. The process of removing hydrogen sulphide from fuel gas which comprises contacting the gas with a solution of two or more electrolytes at least one of which in itself has value as fertilizer, said electrolytes so chosen as not to cause mutual precipitation while being dissolved separating the gas substantially free of gaseous sulphur compounds from the solution, contacting the charged solution with gases resulting from burning sulphur, and separating the precipitated fertilizer compound containing sulphur from the solution.

7. The process of removing hydrogen sulphide from fuel gas which comprises contacting the gas with a solution of two or more electrolytes at least one of which in itself has insecticidal value, said electrolytes so chosen as not to cause mutual precipitation while being dissolved separating the gas substantially free of gaseous sulphur compounds from the solution, contacting the charged solution with gases resulting from burning sulphur, and separating the precipitated insecticidal compound containing sulphur from the solution.

8. The process of removing hydrogen sulphide from fuel gas which comprises contacting the gas with a solution of two or more electrolytes at least one of which in itself has fungicidal value, said electrolytes so chosen as not to cause mutual precipitation while being dissolved separating the gas substantially free of gaseous sulphur compounds from the solution, contacting the charged solution with gases resulting from burning sulphur, and separating the precipitated fungicidal compound containing sulphur from the solution.

9. In the economical removal of hydrogen sulphid from combustible gases with recovery of sulphur in useful form, the process which comprises washing such a combustible gas with an aqueous liquid containing two saline substances in solution so chosen as not to cause mutual precipitation while being dissolved, one being adapted to flocculate suspended sulphur, thereafter treating the aqueous solution with gases from a sulphur burner, removing precipitated sulphur and returning the mother liquor for reuse.

MICHAEL J. LEAHY.